US006992885B2

(12) United States Patent
Wang

(10) Patent No.: US 6,992,885 B2
(45) Date of Patent: Jan. 31, 2006

(54) EXTERNAL CONNECTION DEVICE FOR A STORAGE DEVICE

(75) Inventor: Chia-Jen Wang, Taipei Hsien (TW)

(73) Assignee: DataStor Technology Co., Ltd., Taipei Hsien (TW)

( * ) Notice: Subject to any disclaimer, the term of this patent is extended or adjusted under 35 U.S.C. 154(b) by 65 days.

(21) Appl. No.: 10/605,780

(22) Filed: Oct. 26, 2003

(65) Prior Publication Data

US 2004/0246672 A1 Dec. 9, 2004

(51) Int. Cl.
*G06F 1/16* (2006.01)

(52) U.S. Cl. ...................... 361/685; 361/679; 361/816; 312/107

(58) Field of Classification Search ........ 361/679–685, 361/695, 724–727, 800–818; 312/107, 107.5, 312/111, 223.1, 223.2, 265.6, 332.1; 220/23.2, 220/23.4, 23.6; 206/509, 511; 710/36; 174/35 GC, 174/35 R; 454/184
See application file for complete search history.

(56) References Cited

U.S. PATENT DOCUMENTS 4,296,291 A * 10/1981 Johnson ...................... 200/331
5,604,662 A * 2/1997 Anderson et al. ........... 361/685
5,737,189 A * 4/1998 Kammersgard et al. .... 361/726
5,909,357 A * 6/1999 Orr ........................... 361/687
6,211,458 B1 * 4/2001 Mitchell et al. .......... 174/35 R
6,822,843 B2 * 11/2004 Jitsukawa ................... 361/118
2002/0080580 A1 * 6/2002 Heard ........................ 361/690
2004/0174676 A1 * 9/2004 Shi-Tsung ................... 361/687
2005/0001988 A1 * 1/2005 Sample et al. ................ 353/52
2005/0013110 A1 * 1/2005 Shah et al. ................. 361/685
2005/0060444 A1 * 3/2005 Lum ........................... 710/36

FOREIGN PATENT DOCUMENTS

DE 29604784 U1 * 8/1995
JP 02001267775 A * 9/2004
TW 452321 8/2001
TW 475472 2/2002
TW 531148 5/2003
TW 535929 6/2003
TW 541048 7/2003

* cited by examiner

*Primary Examiner*—Michael Datskovskiy
(74) *Attorney, Agent, or Firm*—Winston Hsu

(57) ABSTRACT

An external connection device for placing and connecting a storage device has a housing, a power output port, and a second signal I/O port. A chamber for placing the storage device is formed in the housing. The housing has a mesh area having a plurality of meshes that allow air to freely pass in and out of the chamber. The power output port is electrically connected to a power input port of the storage device for providing electric energy to the storage device. The second signal I/O port is electrically connected to a first signal I/O port of the storage device for delivering data recorded in the storage device to an electric device.

20 Claims, 8 Drawing Sheets

EXTERNAL CONNECTION DEVICE FOR A STORAGE DEVICE

BACKGROUND OF INVENTION

1. Field of the Invention

The invention relates to an external connection device for placing and connecting a storage device, and more particularly, to an external connection device with a mesh area that is formed with a plurality of meshes to lower the temperature of the storage device.

2. Description of the Prior Art

Data is recorded in digital form for rapid and convenient transmission. As quantities of digital data increase, kinds of digital data storage devices (such as hard disks, CD-ROM drives, or memory cards) appear continually. External connection devices provide an interface for conveniently replacing and installing the storage devices.

Please refer to FIG. 1, which is a diagram showing an external connection device 10 according to prior art. The external connection device 10 holds a hard disk and provides electric energy and a transmission interface to the hard disk. The external connection device 10 comprises a housing 12 and the hard disk is installed in the housing 12. The external connection device 10 further comprises a transmission interface for controlling data access to and from the hard disk, and a DC power input terminal electrically connected to a power supply for providing electric energy. Besides having a data I/O port and a DC power input terminal at the rear side, the housing 12 is airtight. When operating, redundant heat generated by the hard disk will reduce stability and lifetime of the hard disk.

SUMMARY OF INVENTION

It is therefore a primary objective of the claimed invention to provide an external connection device with effective temperature dissipation to solve the above-mentioned problem.

The external connection device is used for installing a storage device. The storage device has a storage media for storing data, a power input port for receiving power and a first signal I/O port for transmitting signals. The external connection device has a housing, at least one power terminal, at least one signal terminal, a power output port, and a second signal I/O port. A chamber for placing the storage device is formed in the housing. The housing has at least one cover and a mesh area. The cover covers the chamber and can be bare-handedly disassembled, and the mesh area has a plurality of meshes that allow air to pass in and out of the chamber. The power output port is electrically connected between the power terminal and the power input port for providing electric energy to the hard disk. The signal terminal delivers data recorded in the storage media to an electric device. The second signal I/O port is electrically connected between the first signal I/O port and the signal terminal such that the data recorded in the storage media can be delivered to the electric device through the second signal I/O port and the signal terminal.

It is an advantage of the claimed invention that the housing has a mesh area so that the meshes allow air to pass in and out of the chamber. The external connection device of the present invention has more effective temperature dissipation than conventional one.

It is a further advantage of the claimed invention that the cover covers the chamber and can be bare-handedly disassembled. Users can install and disassemble the hard disk without tools.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
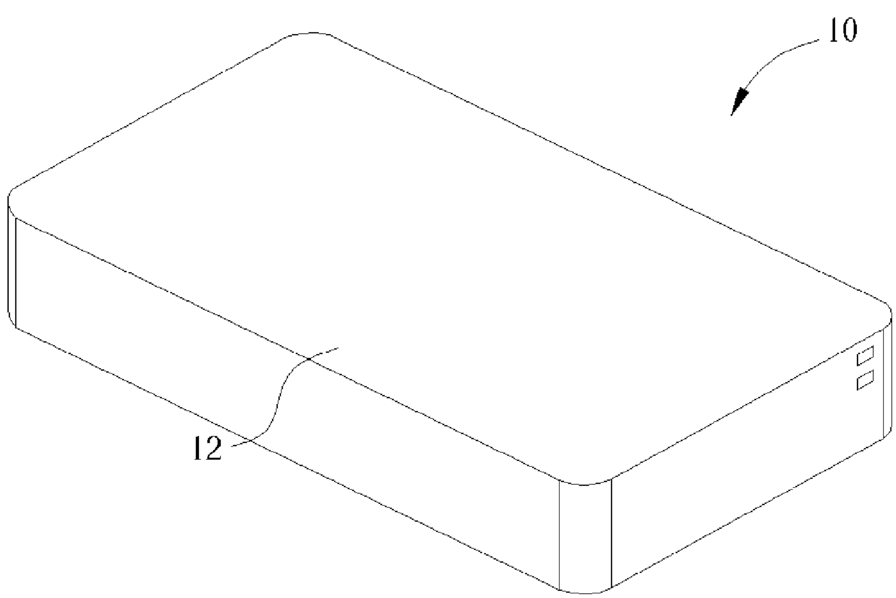
FIG. 1 is a diagram of an external connection device according to prior art.
Figure 2:
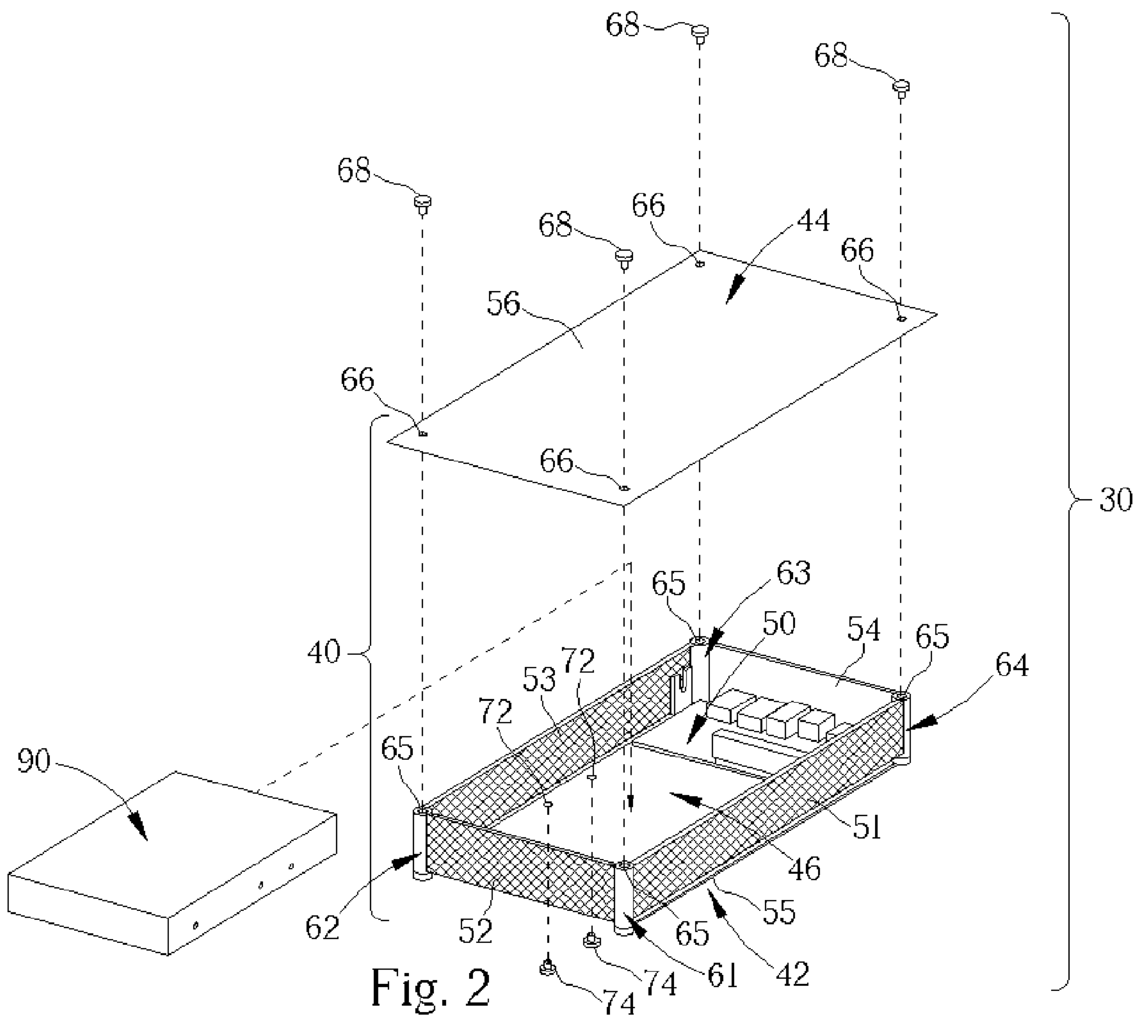
FIG. 2 is a diagram of an external connection device according to present invention.
Figure 3:
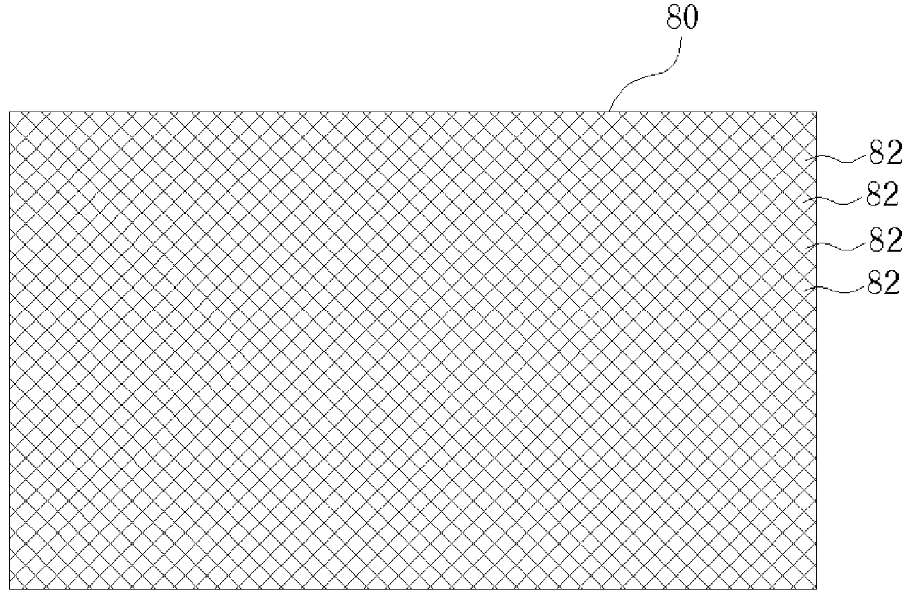
FIG. 3 is a diagram of the mesh area.

FIG. 2 is a diagram of the external connection device 30 according to the present invention. In this embodiment, a storage device 90 installed in the external connection device 30 is a hard disk, but storage devices installed in the external connection device 30 can also be CD-ROM drives, floppy disk drives, ZIP drives, and so on. The external connection device 30 comprises a housing 40 in which a chamber 46 is fashioned for placing the hard disk 90. The housing 40 is formed by a base 42 and a cover 44. The base 42 comprises a first surface 51, a second surface 52, a third surface 53, a fourth surface 54, and a fifth surface 55, and the cover 44 comprises a sixth surface 56. The chamber 46 is surrounded by the six surfaces 51–56. The first surface 51, the second surface 52, and the third surface 53 comprise a mesh area 80 shown in FIG. 3. The mesh area 80 has a plurality of meshes 82 and allows air to pass in and out of the chamber 46. Additionally, the housing 40 is made with metallic material and has effective temperature dissipation.

When installing the hard disk 90 into the chamber 46, the hard disk 90 is screwed in the chamber 46 by two screws 74 to secure the hard disk 90. As FIG. 2 shows, two holes 72 are designed on the fifth surface 55 of the base 42, and the screws 74 can be screwed into bottom of the hard disk 90 through the holes 72. After installing the hard disk 90 into the chamber 46, the cover 44 of the housing 40 covers the chamber 46 to protect the hard disk 90. In this embodiment, the base 42 of the housing 40 further comprises four transparent pillars 61, 62, 63, and 64. Each of the pillars 61, 62, 63, or 64 is set between two surfaces among the first surface 51, the second surface 52, the third surface 53, and the fourth surface 54, and connects the four surfaces 51–54 of the base 42. Each of the pillars 61, 62, 63, or 64 is designed with a screw hole 65 to fix the screws 68. In addition, four holes 66 are formed on the cover 44, and four screws 68 can be screwed into the screw holes 65 of the pillars 61–64 through the holes 66 to tightly fix the cover 44 to the base 42. The screws 68 and 74 can be bare-handedly disassembled without tools. The screw nuts are large in circumference, and users can twist the screw nuts of the screws 68 and 74 to disassemble the screws 68 and 74.

Figure 4:
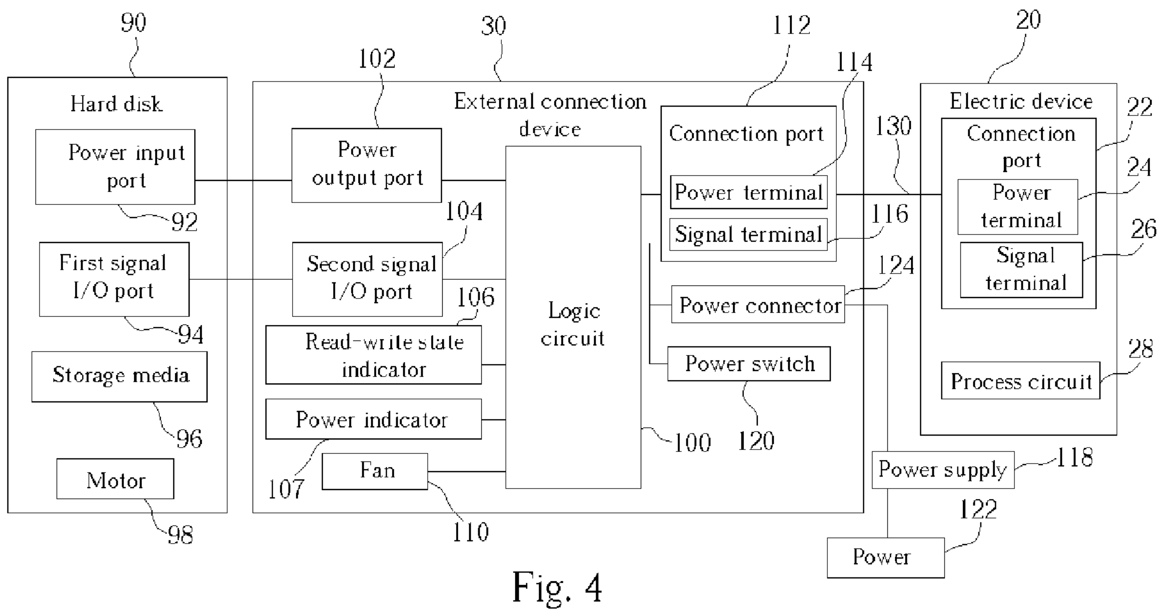
FIG. 4 is a functional block diagram showing the hard disk and the external connection device shown in FIG. 2 connected an electric device.
Figure 5:
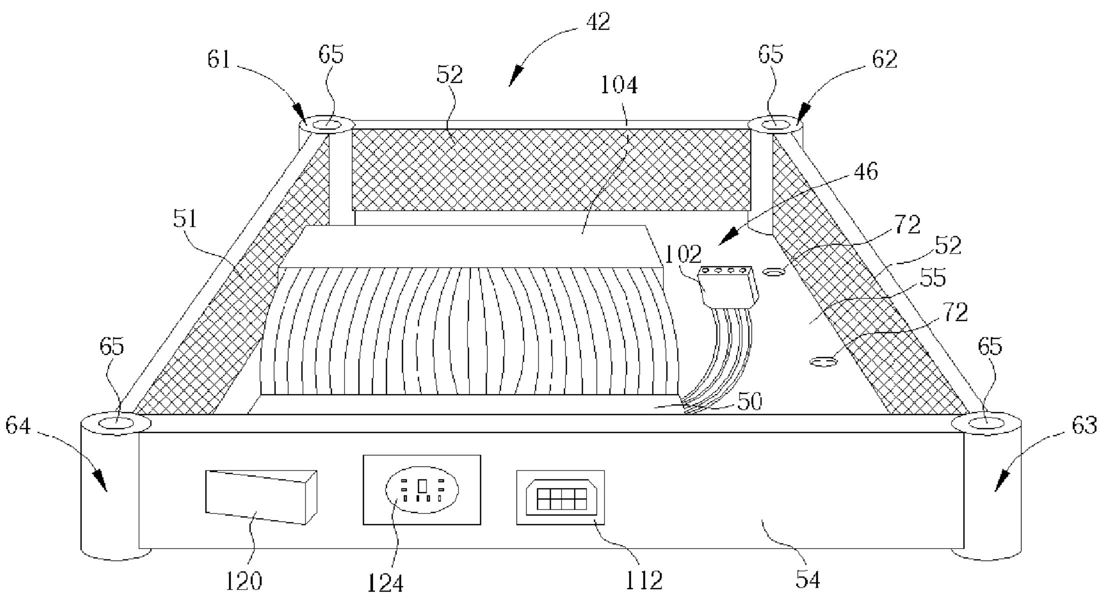
FIG. 5 is a three-dimensional rear view of the base of the housing.

Please refer to FIG. 4 and FIG. 5 for a further explanation of the functions of the external connection device 30. FIG. 4 is a functional block diagram showing the hard disk 90 and the external connection device 30 shown in FIG. 2 connected to an electric device 20. FIG. 5 is a three-dimensional rear view of the base 42 of the housing 40 in FIG. 2. A matter needing attention is that FIG. 4 shows connection of the signal line and the power line between the hard disk 90, the external connection device 30, and the electric device 20, and it seems the hard disk 90 is placed outside the external connection device 30 in FIG. 4, but actually the hard disk 90 is installed in the chamber 46 of the external connection device 30.

In this embodiment, the electric device 20 is a personal computer including a connection port 22 and a process circuit 28. The connection port 22 can be a universal serial bus port (USB port), an IEEE 1394 connection port, or a serial advanced technology attachment (serial ATA) connection port, and the connection port 22 includes at least one power terminal 24 for outputting power energy and at least one signal terminal 26 for transmitting signals. The process circuit 28 is a central processing unit (CPU) for processing data and signals of the electric device 20. Corresponding to the connection port 22 of the electric device 20, the external connection device 30 includes a connection port 112 of the same protocol standard as the connection port 22, which means that the connection port 112 can be a USB port, a IEEE 1394 connection port, or a serial ATA connection port. A transmission cable 130 connects the connection port 22 and the connection port 112.

Additionally, the connection port 112 also includes a power terminal 114 and a signal terminal 116. The power terminal 114 is electrically connected to the power terminal 24 of the connection port 22 for receiving power energy, and the signal terminal 116 is electrically connected to the signal terminal 26 of the connection port 22 for exchanging data with the signal terminal 26. Therefore, by connecting the connection port 22 and the connection port 112, the electric device 20 can output power energy to the external connection device 30 through the power terminal 24 and 114, and can receive and transmit signals to the external connection device 30 through the signal terminals 26 and 116. In addition, the primary objective of the external connection device 30 is placing the hard disk 90 and being an interface for power supply and data transmission between the hard disk 90 and the electric device 20, and is described in detail below.

Please refer to FIG. 4 and FIG. 5, the hard disk 90 includes a power input port 92, a first signal I/O port 94, a storage media 96, and a motor 98. The power input port 92 is electrically connected to a power output port 102 of the external connection device 30 for receiving power energy. The first signal I/O port 94 is electrically connected to a second signal I/O port 104 of the external connection device 30 for transmitting data to the second signal I/O port 104 and receiving control signals from the second signal I/O port 104. The storage media 96 is a magnetic disk that utilizes magnetism to record digital data in "0" and "1". The motor 98 drives the storage media 96 to rotate, and allows the magnetic head of the hard disk 90 to access data stored in the storage media 96. In addition, as mentioned above, the storage device 90 can be another type of data storage devices, such as a CD-ROM drive. If the storage device 90 is a CD-ROM drive, the storage media 96 means a compact disc (CD) that utilizes different reflection ratios to record data.

Moreover, the external connection device 30 further comprises a logic circuit 100, a power connector 124, and a power switch 120. The power output port 102, the second signal output port 104, and the connection port 112 are electrically connected to the logic circuit 100. The logic circuit 100 controls the signal transmission between the signal terminal 116 and the second signal I/O port 104, and allows the electric device 20 to access data stored in the storage media 96 of the hard disk 90. When the electric device 20 reads data stored in the storage media 96, the electric device 20 will send a read control signal. The read control signal is sequentially sent through the signal terminal 26 of the connection port 22, the signal terminal 116 of the connection port 112, the logic circuit 100, the second signal I/O port 104, the first signal I/O port 94, and to the hard disk 90. After receiving the read control signal, the hard disk 90 will read out corresponding data from the storage media 96. The corresponding data is sequentially sent through the first signal I/O port 94, the second signal I/O port 104, the logic circuit 100, the signal terminal 116, the signal terminal 26, and to the electric device 20. In addition, when data is transmitted from the electric device 20 to the hard disk 90 for storage, the transmission route is also sequentially through the signal terminal 26, the signal terminal 116, the logic circuit 100, the second signal I/O port 104, the first signal I/O port 94, and to the hard disk 90.

In addition, the external connection device 30 is electrically connected to an external power supply 118 through the power connector 124, and the power supply 118 is electrically connected to an external power 122 for transforming the AC voltage of the power 122 to a stable DC voltage that is provided to the external connection device 30. A portion of power energy supplied to the hard disk 90 is provided by the power terminal 114 and the other portion is provided by the power supply 118. If the power energy supplied to the external connection device 30 from the power terminal 24 and 114 is sufficient, it is not necessary to provide the power connector 124 and the power supply 118 in this embodiment.

Furthermore, the power switch 120 controls power energy of the external connection device 30 to close and open. When users need to separate the external connection device 30 from the electric device 20, users can close the external connection device 30 with the power switch 120 and then remove the transmission cable 130 from the connection port 112. Similarly, when users need to connect the external connection device 30 to the electric device 20, users can connect the transmission cable 130 to the connection port 112 and open the power switch 120.

In addition, as FIG. 5 shows, the external connection device further comprises a circuit board 50. The circuit board 50 is placed at a flank of the chamber 46 and is next to the fourth surface 54 of the base 42. The logic circuit 100 is formed on the circuit board 50, and the power output port 102, the second signal I/O port 104, the connection port 112, and the power switch 120 are all connected to the circuit board 50. The power connector 124, the power switch 120, and the connection port 112 are exposed on the fourth surface 54 of the base 42 for convenient operation. Besides, as FIG. 2 shows, when the hard disk 90 is installed in the chamber 46, the hard disk 90 is next to the circuit board 50 without overlapping. This type of installation can reduce thickness of the external connection device 30. Certainly, the circuit board 50 can be also placed on bottom of the chamber 46 and when the hard disk 90 is installed in the chamber 46, the hard disk 90 is above and overlaps the circuit board 50. This type of installation can reduce length of the external connection device 30.

Figure 6:
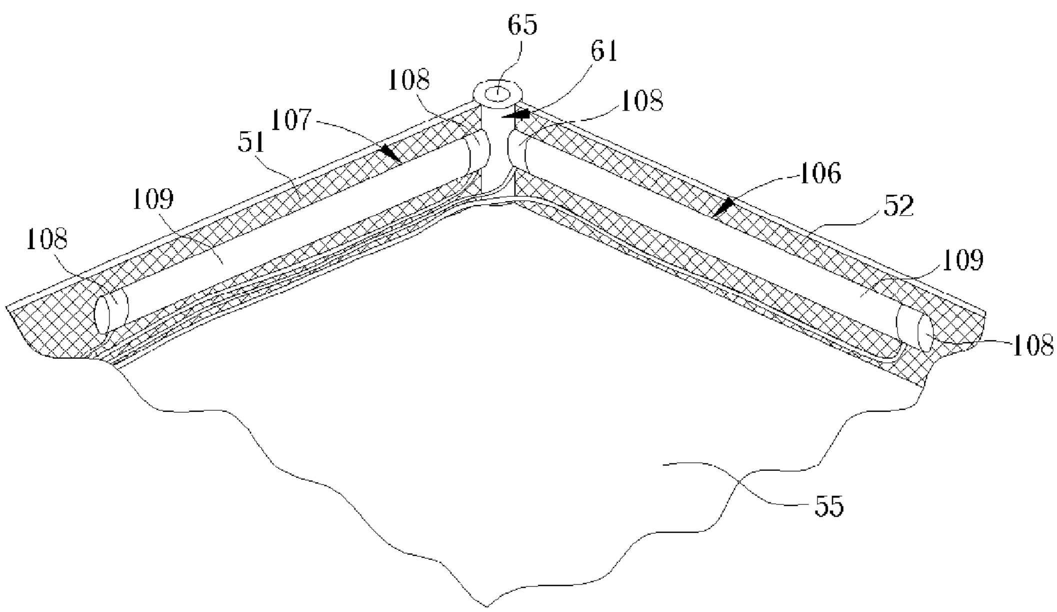
FIG. 6 is a magnified diagram of part of the base of the external connection device.

Please refer to FIG. 6, which is a magnified diagram near the transparent pillars 61 of the base 42 of the external connection device 30 in FIG. 2. As FIG. 4 and FIG. 6 show, the external connection device 30 further comprises a read-write state indicator 106 and a power indicator 107 respectively installed on the second surface 52 and the first surface 51. The read-write state indicator 106 and the power indicator 107 are electrically connected to the logic circuit 100. The read-write state indicator 106 indicates read and write states of the hard disk 90, and the power indicator 107 indicates power supply state of the hard disk 90. When power energy is supplied to the hard disk 90, the power indicator 107 will illuminate. The logic circuit 100 controls the read-write state indicator 106 in accordance with the operation mode of the hard disk 90 to show the read-write state of the hard disk 90.

In this embodiment, the read-write state indicator 106 and the power indicator 107 respectively include a light guide tube 109 and two illuminants 108. These two illuminants 108 are placed at two ends of the light guide tube 109, and the light guide tube 109 can guide light from the illuminants 108 and uniformly disperse the light. Since the logic circuit 100 controls the illuminants 108 of the read-write state indicator 106 in accordance with the operation mode of the hard disk 90, the illuminants 108 of the read-write state indicator 106 illuminate in accordance with the read-write state of the hard disk 90.

Figure 7:
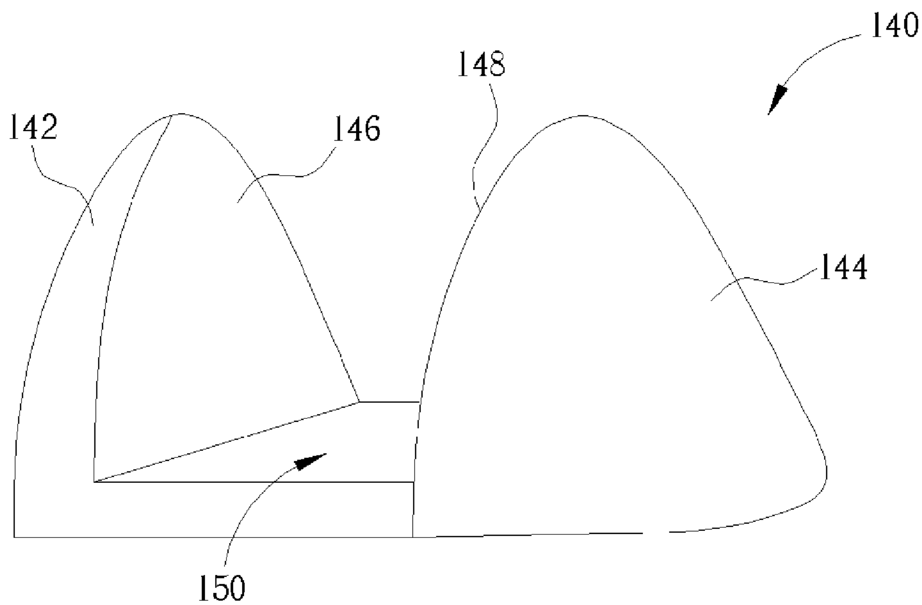
FIG. 7 is a diagram of the support of the external connection device.
Figure 8:
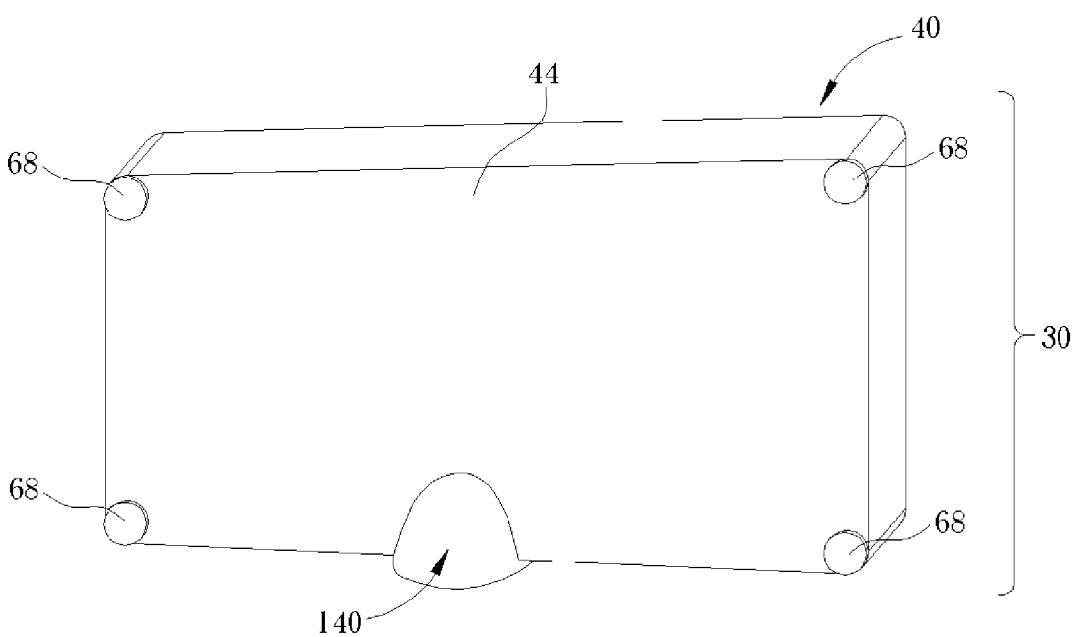
FIG. 8 is a diagram showing the housing placed on the support shown in FIG. 7.

For convenient placement of the external connection device 30, the external connection device 30 further includes a support 140 for fixing the housing 40 of the external connection device 30. Please refer to FIG. 7 and FIG. 8. FIG. 7 is a diagram showing the support 140 of the external connection device 30 and FIG. 8 is a diagram showing the housing 40 placed on the support 140. As FIG. 7 shows, the support 140 comprises two ridges 142 and 144. The ridges 142 and 144 respectively have a plane 146 and another plane 148, and the planes 146 and 148 are opposite. Between the planes 146 and 148, a fillister 150 is formed, and the housing 40 can be placed in the fillister 150. When the housing 40 is placed in the fillister 150, the fillister 150 will fix the two surfaces 55 and 56 of the housing 40 and support the housing 30.

For improving the temperature dissipation of the external connection device 30, the external connection device 30 further comprises a fan 110 (as FIG. 4 shows) for circulating air passing in and out of the chamber 46. When the hard disk 90 is operating, the redundant heat generated by the hard disk 90 can be effectively dissipated.

In contrast to the prior art, the external connection device of present invention has a mesh area. The mesh area allows air to pass in and out of the chamber so that the redundant heat of the hard disk can be effectively dissipated when operating. The temperature of the storage device placed in the chamber can be effectively controlled. The stability and lifetime of the external connection device are successfully improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An external connection device for placing and connecting a hard disk, the hard disk comprising:

a storage media for storing data;

a power input port for receiving power; and a first signal I/O port for transmitting signals;

the external connection device comprising:

a housing having at least one cover and a mesh area and forming a chamber for placing the hard disk, wherein the cover covers the chamber and is fastened to the housing utilizing a plurality of thumb screws, and the mesh area has a plurality of meshes that allow air to pass in and out of the chamber;

at least one power terminal electrically connected to a power;

at least one signal terminal for delivering data recorded in the storage media to an electric device;

a power output port electrically connected between the power terminal and the power input port for providing electric energy to the hard disk; and a second signal I/O port electrically connected between the first signal I/O port and the signal terminal, wherein the data recorded in the storage media can be delivered to the electric device through the second signal I/O port and the signal terminal.

2. The external connection device of claim 1 wherein the housing further comprises a plurality of screw holes for installing the plurality of thumb screws to fasten the cover.

3. The external connection device of claim 1 wherein the housing is made with metallic material, the housing has six surfaces, and at least two surfaces are composed of the mesh area.

4. The external connection device of claim 1 wherein the power terminal and the signal terminal respectively are a universal serial bus port (USB port), an IEEE 1394 connection port, or a serial advanced technology attachment (serial ATA) connection port.

5. The external connection device of claim 1 further comprising a power switch electrically connected to the power terminal for turning on/off the external connection device, and the power terminal is connected to a power supply for providing extra electric energy to the external connection device.

6. The external connection device of claim 1 further comprising a read-write state indicator placed in the chamber for indicating state of the hard disk, the read-write state indicator comprises at least one illuminant illuminating in accordance with the read-write state of the hard disk and at least one light guide tube for guiding and distributing light of the illuminant.

7. The external connection device of claim 1 further comprising a circuit board in which a logic circuit is formed for controlling signal transmission at the signal terminal and the second signal I/O port.

8. The external connection device of claim 7 wherein the circuit board is placed in the chamber, and the hard disk is above and overlaps the circuit board when the hard disk is installed in the chamber.

9. The external connection device of claim 7 wherein the circuit board is placed at a flank of the chamber, and the hard disk is next to the circuit board when the hard disk is installed in the chamber.

10. The external connection device of claim 1 further comprising a fan for circulating air passing in and out of the chamber.

11. The external connection device of claim 1 further comprising a support for fixing the housing.

12. An external connection device for placing and connecting a storage device, the storage device comprising:

a storage media for storing data;

a power input port for receiving power; and a first signal I/O port for transmitting signals;

the external connection device comprising:

a housing having at least one mesh area and forming a chamber for placing the storage device, wherein the mesh area has a plurality of meshes that allow air to pass in and out of the chamber;

a read-write state indicator placed in the chamber for indicating state of the storage media, the read-write state indicator comprises at least one illuminant illuminating in accordance with the read-write state of the storage media and at least one light guide tube for guiding and distributing light of the illuminant;

a power output port electrically connected to the power input port for providing electric energy to the storage device; and a second signal I/O port electrically connected to the first signal I/O port, wherein the data recorded in the storage media can be delivered to an electric device.

13. The external connection device of claim 12 wherein the housing further comprises a cover and a plurality of screw holes, the cover is fixed on the housing with a plurality of thumb screws and the cover can be disassembled from the housing without the use of tools.

14. The external connection device of claim 12 wherein the housing has six surfaces and at least two surfaces are composed of the mesh area.

15. The external connection device of claim 12 wherein the housing is made with metallic material.

16. The external connection device of claim 12 further comprising:

at least one power terminal for providing electric energy to the external connection device and making the power output port provide electric energy to the storage device; and at least one signal terminal electrically connected between the second signal I/O port and an electric device for delivering data recorded in the storage media to the electric device.

17. The external connection device of claim 16 wherein the power terminal and the signal terminal respectively are a universal serial bus port (USB port), an IEEE 1394 connection port, or a serial advanced technology attachment (serial ATA) connection port.

18. The external connection device of claim 16 further comprising a power switch electrically connected to the power terminal for turning on/off the external connection device, and the power terminal is connected to a power supply for providing extra electric energy to the external connection device.

19. The external connection device of claim 12 further comprising a circuit board in which a logic circuit is formed for controlling signal transmitting at the second signal I/O port.

20. The external connection device of claim 19 wherein the circuit board is placed in the chamber and the storage device is above and overlaps the circuit board when the storage device is installed in the chamber.

* * * * *

UNITED STATES PATENT AND TRADEMARK OFFICE

CERTIFICATE OF CORRECTION

PATENT NO. : 6,992,885 B2
APPLICATION NO. : 10/605780
DATED : January 21, 2006
INVENTOR(S) : Chia-Jen Wang et al.

It is certified that error appears in the above-identified patent and that said Letters Patent is hereby corrected as shown below:

On the Title page:

After item (65), insert -- (30) Foreign Application Priority Data

July 21, 2003 [TW] Taiwan…………………..092119871 U --.

Signed and Sealed this

Fifth Day of September, 2006

JON W. DUDAS
*Director of the United States Patent and Trademark Office*

UNITED STATES PATENT AND TRADEMARK OFFICE

CERTIFICATE OF CORRECTION

PATENT NO. : 6,992,885 B2
APPLICATION NO. : 10/605780
DATED : January 31, 2006
INVENTOR(S) : Chia-Jen Wang et al.

It is certified that error appears in the above-identified patent and that said Letters Patent is hereby corrected as shown below:

On the Title page:

After item (65), insert -- (30) Foreign Application Priority Data

July 21, 2003 [TW] Taiwan.......................092119871 U --.

This certificate supersedes Certificate of Correction issued September 5, 2006.

Signed and Sealed this

Seventh Day of November, 2006

JON W. DUDAS
*Director of the United States Patent and Trademark Office*